Nov. 16, 1965  E. W. SHEWELL  3,217,894
LOCKING MECHANISM
Filed Oct. 3, 1963  5 Sheets-Sheet 1

INVENTOR.
EARL W. SHEWELL
BY *Arne J. Fors*
Attorney

Nov. 16, 1965   E. W. SHEWELL   3,217,894
LOCKING MECHANISM
Filed Oct. 3, 1963   5 Sheets-Sheet 2

INVENTOR.
EARL W. SHEWELL
BY *Arne J. Fors*
Attorney

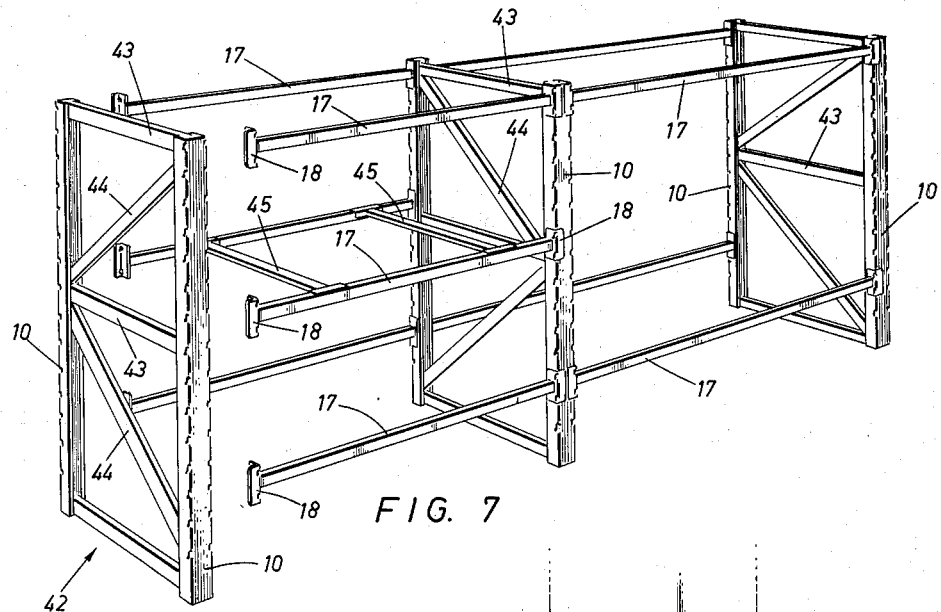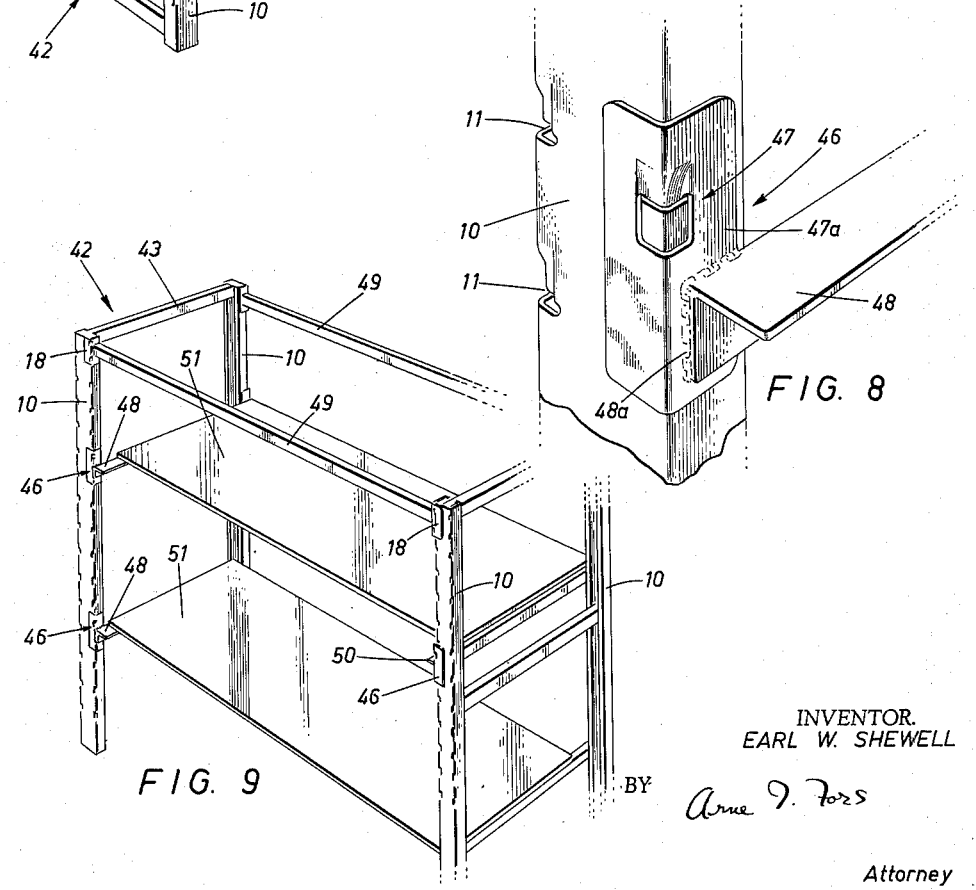

Nov. 16, 1965 E. W. SHEWELL 3,217,894
LOCKING MECHANISM
Filed Oct. 3, 1963 5 Sheets-Sheet 5

INVENTOR.
EARL W. SHEWELL
By
Agent.

United States Patent Office 3,217,894
Patented Nov. 16, 1965

3,217,894
LOCKING MECHANISM
Earl W. Shewell, Hamilton, Ontario, Canada, assignor to Arcan Eastern Limited, Hamilton, Ontario, Canada, a company of Ontario
Filed Oct. 3, 1963, Ser. No. 314,586
7 Claims. (Cl. 211—177)

This application is a continuation-in-part of my co-pending application for United States Letters Patent Ser. No. 269,643, filed April 1, 1963.

This invention relates to an improved inter-connecting, disengageable structure. It is particularly directed to providing an improved locking mechanism for use in detachably securing together and/or supporting the component parts of pallet racks, shelf racks, scaffolding and other like constructions to form, when assembled, a rigid, interconnected, self-supporting structure and which can be quickly and easily disengaged for dismantling the structure for transportation and storage.

Securing and joining means are well known and are widely used in the art to which this invention relates. For example, conventional pallet racks, which are normally fabricated from channel and angle steel members, are usually assembled into rigid integral units by means of a plurality of bolts, screws, nuts and other like fastening elements, or by interlocking joints which utilize additional connecting devices by means of which a structure can be assembled and dismantled as desired.

Structures used as racks, shelving, scaffolding and the like normally comprise upright truss post assemblies, horizontal beam support members and the connecting means hereinbefore mentioned. The post assemblies usually are fabricated from two vertical columns rigidly secured a spaced distance apart from one another by horizontal and diagonal structural members which are welded or otherwise secured thereto. The post assemblies provide rigidity in the vertical plane transverse to the long axis of the structure. At the installation site, horizontal beams are secured to the upright post assemblies by connecting means. Ancillary members such as cross-braces or locking devices are commonly installed to provide rigidity in the longitudinal plane of the structure. Locking devices such as removable pins, for example, are used to anchor horizontal support members to the vertical columns and to provide additional rigidity in the longitudinal plane of the structure.

These conventional constructions therefore have required the use of bolts or other fastening devices which involve the maintenance of a substantial inventory of parts and hand tools and, generally, the employment of at least semi-skilled workmen. Also, the use of ancillary structures, such as locking devices and cross-bracing arrangements, to provide rigidity in the longitudinal plane of the assembled structure, present installation problems. The multiplicity of parts required and/or the installation time required for the proper erection of a rigid and self-supporting structure often increase capital investment and erection costs to prohibitive levels and thereby render available structures uneconomical. It is also apparent that many prior structures are not flexible to the changing requirements of the user.

Many of the deficiencies inherent in prior structures have been overcome by the improved locking mechanism employed in the structure of this invention. I have found also, that in addition to overcoming the disadvantages inherent in prior structures, the present structure provides the advantage of effectively distributing vertical, torsional and lateral loads such that the pressure loading on a unit area of the structural materials is substantially reduced. Also, the load forces on each post member and connecting plate member are so resolved as to impose tensional stresses on the post and plate materials rather than shear stresses. Therefore, the loading capacity of the structure is substantially increased and the safety factors enhanced.

It is, therefore, an important object of the present invention to provide an interconnecting, disengageable structure having locking mechanisms for structural parts which provide quick and easy assembly combined with improved strength and rigidity of construction.

A further important object of the present invention is to provide a locking mechanism of simple construction which can be readily and inexpensively manufactured.

A still further object of the present invention is to provide constructions which are rigid and self-supporting in their assembled positions and which obviate the necessity of a multiplicity of cross-braces and supporting members and ancillary interlocking members.

An understanding of the manner in which these and other objects of the present invention can be attained may be had from the following description, reference being made to the accompanying drawings, in which:

FIGURE 7 is a perspective view of an embodiment of a truss post assembly and a complete rack construction secured into a rigid structure by the locking mechanism illustrated in detail in FIGURES 1 through 5;

FIGURE 8 is a perspective view of an embodiment of the joining mechanism in which a single locking projection is employed;

FIGURE 9 is a perspective view of a rack construction using the locking mechanism illustrated in FIGURE 8 which permits drive-in loading of the racks for the loading of pallets or trays;

Like reference characters refer to like parts throughout the description of the drawings.

Figure 1:
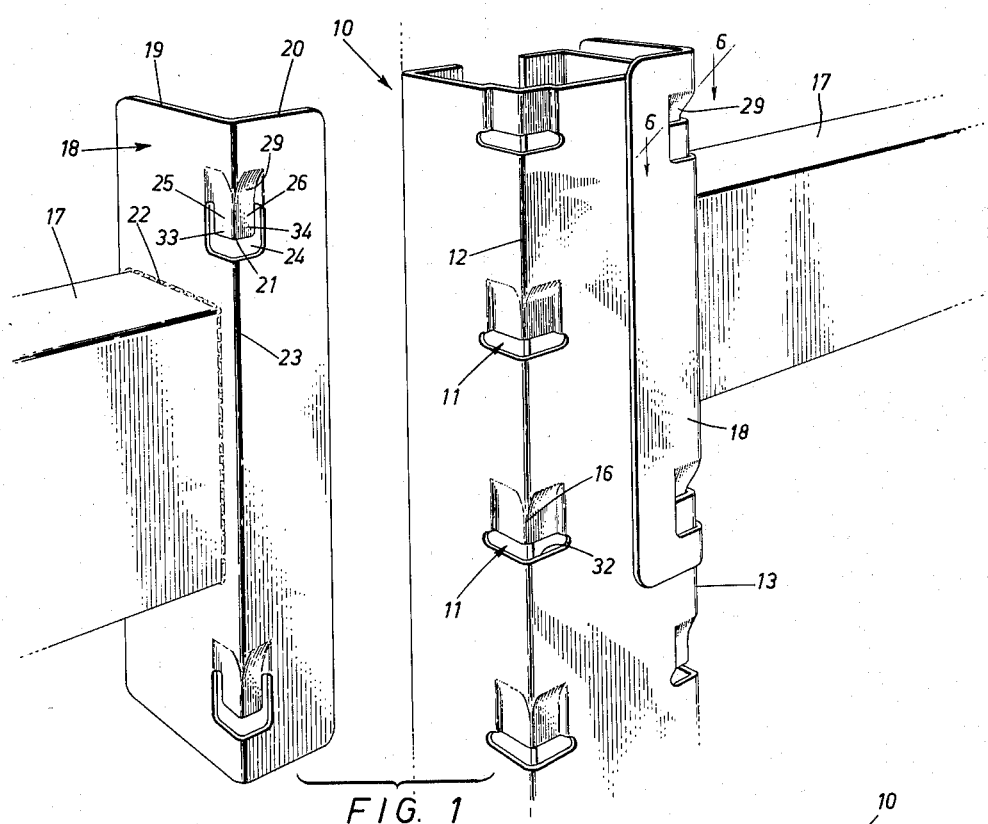
FIGURE 1 is a perspective view of an embodiment of the locking mechanism of the invention showing a horizontal support or shelf member connected to an end plate rigidly but removably secured to a vertical post member and a second end plate in readiness for mounting on the post member.
Figure 2:
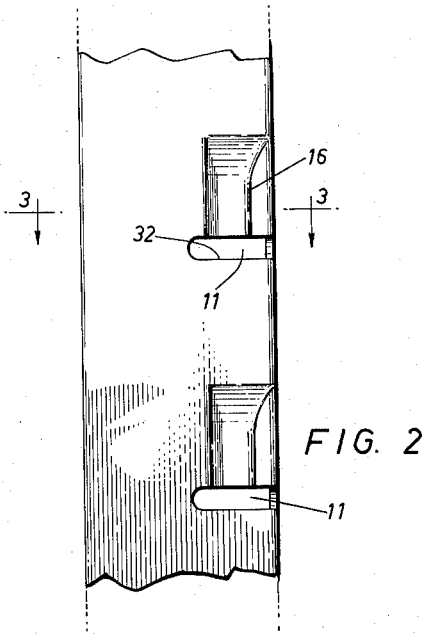
FIGURE 2 is a vertical side view of a post member.
Figure 3:
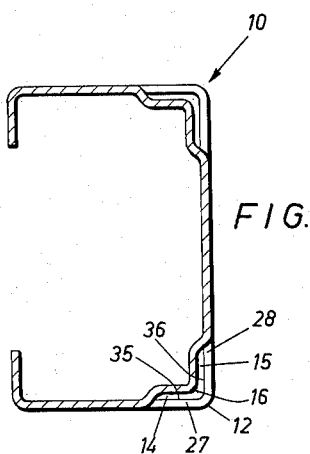
FIGURE 3 is a plan section taken along the line 3—3 of FIGURE 2.

Referring to the drawings, the numeral 10 designates a vertical post or column member of hollow, rectangular construction, having indented apertures 11 formed therein at predetermined intervals along the length of corners 12, 13 thereof. Also formed in member 10 above each aperture 11 are guide recesses 14, 15 and intermediate of the guide recesses 14, 15 an inwardly tapering centre portion 16, as most clearly illustrated by FIGURES 2 and 3, the purpose of which will be described in detail hereinafter.

The numeral 17 designates a horizontal support member having an end plate 18 rigidly secured thereto. End plate 18 is formed of angle material having two wing portions 19, 20. Formed in the bight of end plate 18 are a pair of vertically spaced downwardly extending locking projections 21 struck inwardly from the material of the plate. An end plate 18 is rigidly secured to each end of each horizontal support member 17 substantially at right angles thereto by a fillet weld 22 or other like joining means. End plate 18 is bent to conform with either of outside corners 12, 13 of column member 10 and to provide a close-fitting joint therewith.

Figure 5:
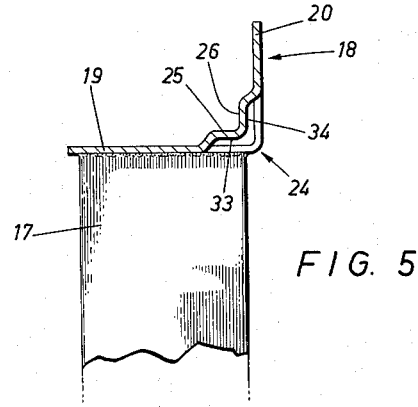
FIGURE 5 is a plan section taken along line 5—5 of FIGURE 4.
Figure 6:
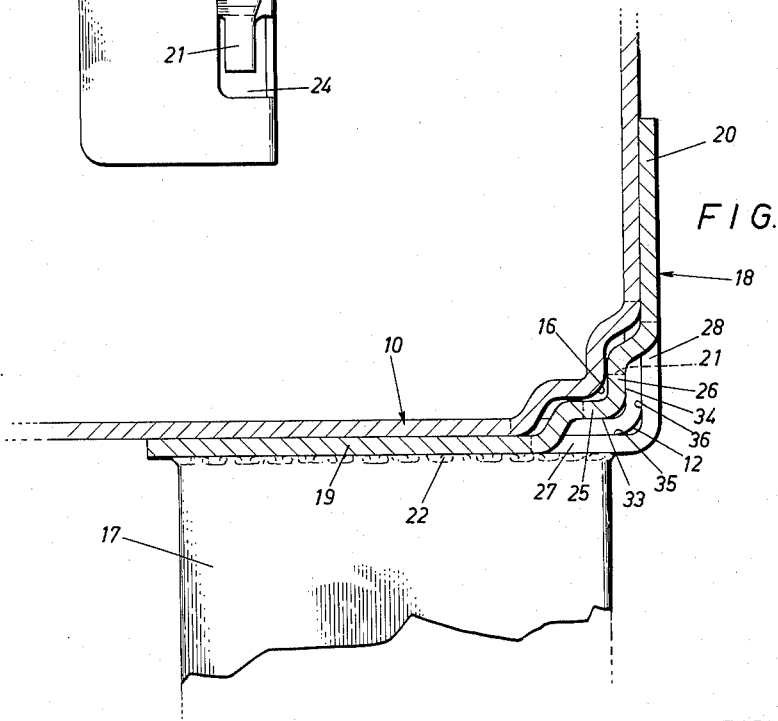
FIGURE 6 is a plan section taken along line 6—6 of FIGURE 1.

Each of downwardly extending projections 21 located at spaced intervals in the bight of corner 23 of end plate 18 is formed by removing a substantially U-shaped cut-out 24 therefrom and then inwardly deforming the material enclosed by and immediately above the U-shaped cut-out 24 to form, in section, as illustrated by FIGURES 5 and 6, a substantially W-shaped member having walls 25, 26 spaced from and substantially parallel to the inner extension of corner walls 27 and 28 and an inwardly tapering centre portion 29. Projections 21 are vertically spaced a predetermined distance apart from one another substantially equal to a multiple of the longitudinal spacing of apertures 11 in column member 10.

In the embodiment shown, a pair of projections 21 are co-extensive with three apertures 11. The spacing of projections 21 is determined by the rigidity and vertical load and torsional load requirements of the horizontal support members 17. The spacing of apertures 11 is determined by the structural strength of column member 10 and by the degree of vertical adjustment of horizontal members 17 desired.

In assembling a structure, an end plate 18 is brought into bearing relationship with an outside corner of vertical column 10 and downwardly extending projections 21 of end plate 18 are introduced into apertures 11 such that said projections seat themselves in apertures 11 with the walls 25 and 26 of projection 21 overlying recesses 14, 15 on the vertical column 10 and tapering central portion 29 on plate 18 closely overlying centre portion 16 on column 10. Projection 21 of end plate 18 is lowered into aperture 11 until upper bearing surfaces 30 and 31 of U-shaped cut-out 24 engage in snug fitting relationship with the lower bearing surface 32 of aperture 11. Simultaneously, bearing surfaces 33 and 34 of walls 25 and 26 of projection 21 will assume a snug fitting abutting relationship with inner surfaces 35 and 36 of the walls 27 and 28 of vertical column member 10, thereby forming a tight fitting connection with the walls of column 10 which provides rigidity in both transverse and longitudinal planes, as most clearly illustrated by FIGURE 6.

The torsional and lateral loads on the horizontal supporting members 17 are thus transmitted by way of end plates 18 to post members 10 through the abutting bearing surfaces created by the contacts of the walls of projections 21 with the corresponding walls of the post members 10. Since the bearing loads are transmitted over substantially large bearing surfaces, the loading stresses per square centimetre on the coupling members are minimized, thereby maintaining the structural stresses at a safe working level. Also, the torsional and lateral loads are so resolved by the coupling mechanism that the structural materials are brought under tension instead of the normal shear stresses, thereby further enhancing the structural load capacities.

Figure 4:
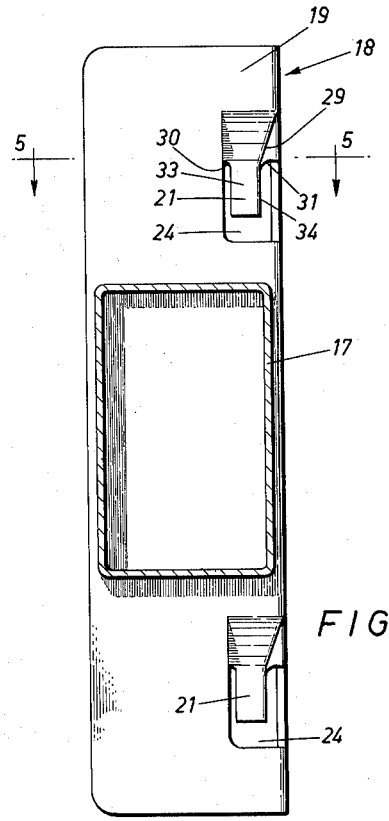
FIGURE 4 is a side elevation, partly in section, of the connecting plate structure.

In addition, the pair of spaced locking projections 21, illustrated in detail in FIGURE 4, interacts to provide an effective counter to vertical and torsional deflection of horizontal member 17 due to turning moments resulting from improperly aligned or unbalanced loads on the horizontal member. Also, the pair of spaced locking projections provide added rigidity in the vertical longitudinal plane of the structure.

The vertical loads transmitted from support members 17 to post members 10 by the end plates are so resolved by the tapered portion 29 of each projection 21 that projections 29 will not fail by bending when overloaded but rather bearing surfaces 30 and 31 will act into abutting surfaces 32 of the post member causing a metal build-up and work hardening which assists the deformation and provides a warning of the overloaded condition.

FIGURE 7 illustrates an embodiment of an upright truss post construction 42 employed with the locking elements hereinabove described to permit erection of the rack construction. Each truss post construction comprises two vertical column members 10 and horizontal and diagonal channels 43 and 44 which are rigidly secured a spaced distance apart by welding or the like means. Thus, the truss construction provides rigidity in the transverse plane taken at right angles to the long axis of the structure. The use of horizontal transverse members 45 may be desired for bulk storage. The transverse members 45 are preferably slidably mounted on longitudinal members 17 and can be readily adjusted for changing load requirements.

It may be desired to assemble rack structures such that drive-in loading is possible. FIGURE 8 illustrates a joining element 46 in which a single locking projection 47 is adapted to engage with a slot 11 in column 10. An angle steel member 48 is rigidly secured to a face 47 of the joining plate as shown, by fillet welding 48a or by like securing means.

FIGURE 9 illustrates a completed rack assembly employing this latter embodiment. Truss post assemblies 42 are rigidly held a fixed distance apart by horizontal beams 49 which are secured thereto by means described in detail hereinabove. The beams 49 are positioned at the topmost extremities of the post assemblies to permit ample clearance of the movement of a loading or unloading vehicle therebelow. Joining elements 46 are secured to truss post 10 in the manner which also has been described hereinbefore in detail, and angle steel member 48, which is rigidly secured thereto, extends horizontally therebetween in a direction transverse to the supporting beams 49.

In a similar manner, angle steel member 50 is secured to the posts of the second truss post assembly in the same horizontal plane as angle steel member 48.

Truss post assemblies 42 are spaced a predetermined distance apart such that trays or pallets 51 can be mounted on the angle steel members 48 and 50. A plurality of pairs of angle steel members can be mounted on the posts, the vertical proximity of these members being adjustable to the height of the articles stored.

The rack assemblies can be assembled in back-to-back and side-to-side relationship, thus creating a plurality of loading passageways. This is a preferred arrangement for bulk stock piling of bottles and the like.

To supplement the vertical load capacity and the strength and rigidity of the locking mechanisms, it may be preferred to lengthen the end plates of the two embodiments illustrated and to add thereto an additional locking projection.

Figure 10:
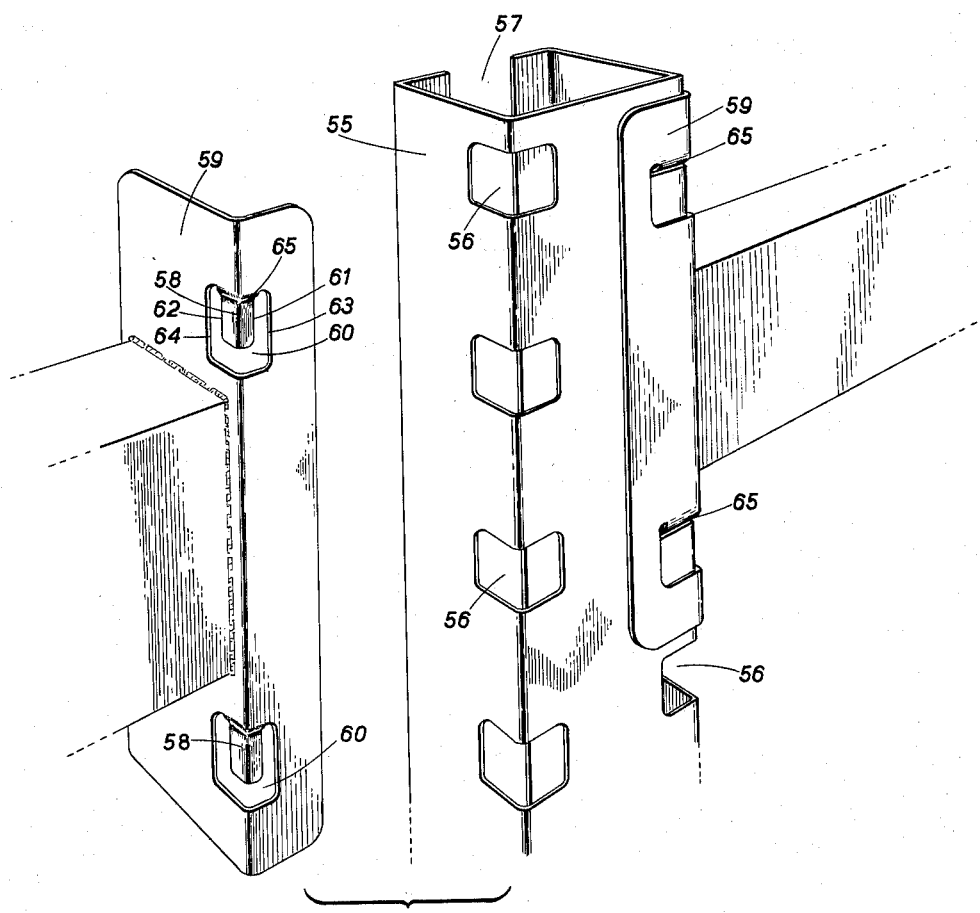
FIGURE 10 is a perspective view of another embodiment of the locking mechanism of the present invention.

The embodiment of locking mechanism illustrated in FIGURE 10 comprises a column 55 which has a plurality of equispaced rectangular slots 56 formed along the two outside corners on the side opposite to open side 57. A pair of spaced downwardly extending projections 58 are struck inwardly from the material of plate 59 after the removal of a U-shaped cut-out 60 such that the edges 61 and 62 of projections 58 are spaced from the corresponding edges 63 and 64 of plate 59 a distance substantially equal to the thickness of said plate material. The upper indented portion of projection 58 forms a shoulder 65 below the level of the upper connection of the edges 61 and 63 and 62 and 64.

In assembling this embodiment of the locking mechanism, projections 58 are inserted into mating column slots 56 and the end plate lowered such that projection shoulders 65 abut the lower edges 66 of the said slots. This embodiment is similar structurally and functionally to the embodiment of locking mechanism illustrated in FIGURES 1 to 6 inclusive with the exception that the vertical load is transmitted across projection shoulder 65 in place of the two bearing surfaces 30 and 31 of the latter embodiment and slot 56 is enlarged to obviate the need for a gradual wall taper. Torsional and lateral loads are distributed in the same manner in both embodiments, thereby providing optimum load and stability characteristics.

Figure 11:
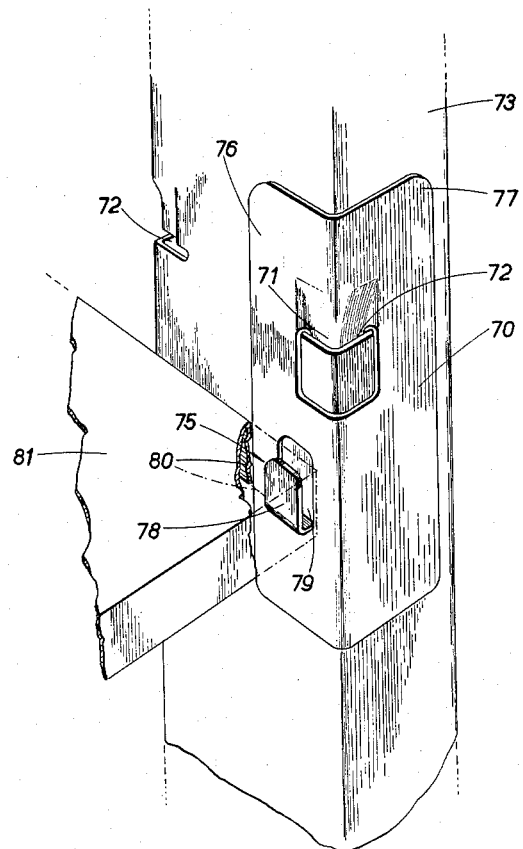
FIGURE 11 is a perspective view of still another embodiment of the present invention wherein a bracket support is substituted for a horizontal support member.

The embodiment of locking mechanism shown in FIGURE 11, wherein a load supporting bracket is substituted for a horizontal support member, comprises an L-shaped end plate 70 having at least one downwardly extending projection 71 struck inwardly from the material of plate 70 in the bight portion thereof. Projection 71 is adapted to be inserted into one of equispaced openings 72 formed in the corner of post member 73 in the manner described hereinabove with reference to the locking mechanism embodiments illustrated.

An upstanding bracket 75 struck outwardly from the material of plate 70 or rigidly secured thereto is formed in the exterior face of at least one of wings 76 or 77. In the embodiment illustrated, the upstanding portion 78 of bracket 75 is spaced from the face of wing 76 a predetermined distance to define a slot 79 between the plane of wing 76 and the bracket which is adapted to receive flange 80 of shelf 81.

In use, end plates 70 preferably are attached at an equal height to a corner of each of four spaced-apart post members 73 such that a shelf 81 is supported at each corner by brackets 75. Slots 79 defined by each bracket can be formed with a width substantially equal to the thickness of flanges 80 such that the flanges are tightly gripped by the bracket to provide lateral as well as vertical load support.

It will be understood, of course, that although the load supporting bracket illustrated by FIGURE 11 is described in combination with the mechanism illustrated by FIGURES 1 through 9, this description is illustratory only of a use of the structure and the load supporting bracket can be employed with the structure illustrated by FIGURE 10. It will also be understood that the description hereinabove of vertical post members is illustratory only of the use of the present invention and that the use of post members inclined to the vertical falls within the scope and purview of the invention.

The present invention possesses a number of important advantages. The structure is easily assembled and, when assembled, provides sufficient transverse and longitudinal rigidity to assemblies such as pallet and shelf racks to make unnecessary the many cross members and braces which otherwise are necessary. The vertical, torsional and lateral load forces are so resolved by the coupling mechanism that the structural materials are brought into tension, thereby providing maximum structural strength and obviating, or at least substantially reducing, the shear stresses on the material. It is well known that structural materials such as steel are relatively stronger in tension than in shear and thus advantage is taken of the natural characteristics of the structural material. The joining elements permit quick and ready assembly and dismantling of portions of the whole structure. The use of joining devices such as screws, bolts and ancillary locking devices and the like is obviated, thereby facilitating ease and quickness of installation and, also, reducing fabricating tool requirements and equipment costs. The post and horizontal beam or flange-receiving bracket support members can be readily manufactured or formed from standard metal products.

It will be understood, of course, that modifications can be made in the preferred embodiment of the invention described and illustrated herein without departing from the scope of the invention as defined by the appended claims.

What I claim as new and desire to protect by Letters Patent of the United States is:

1. In an interconnecting, disengageable structure which comprises post members and load supporting members slots formed at intervals along at least one corner of each post member, means for detachably securing said load supporting members to said post members which comprise an L-shaped end plate having two wings and having one wing portion thereof secured to said load supporting members, a downwardly extending projection struck inwardly from the material of the plate at the centre thereof where the two wings of the L-shaped plate meet, said projection being of a shape to enter the slots formed in the post members and having walls shaped substantially according to the configuration of the corner of the post and offset from the outer surfaces of the plate for abutment with the walls of the portion of the slotted corner of the opposing post member with which the projection is in engagement, said projection walls being continuously joined to the plate walls by a tapered corner portion.

2. An interconnecting, disengageable structure as claimed in claim 1 having a plurality of spaced, downwardly extending projections formed in the bight portion of each end plate.

3. An interconnecting, disengageable structure as claimed in claim 1 having reinforcing members extended between adjacent post members and rigidly secured thereto in diagonal relation.

4. An interconnecting, disengageable structure as claimed in claim 1 having transverse, horizontally disposed load supporting members extended between and detachably secured to parallel pairs of longitudinally extending load supporting members.

5. In an interconnecting, disengageable structure having post members and load supporting members, slots formed at intervals along at least one corner of each post member, means for detachably securing said load supporting members to said post members each of which comprises an end plate secured to a load supporting member, each end plate being L-shaped forming two wings and having one wing portion thereof secured to said load supporting member, a downwardly extending projection struck inwardly from the material of the plate at the centre thereof where the two wings of the L-shaped plate meet, said projection being of a shape to enter the slots formed in the post members and having its lower portion formed with walls at right angles to each other substantially parallel with the walls of the post member such that the outer surfaces of said projection walls abut the mutually co-extensive inner surfaces of the post member walls.

6. A disengageable structure comprising, in combination, a post member having slots formed at intervals along at least one corner of said post member, an L-shaped plate having two wing portions defining a bight portion therebetween, load supporting means formed on one wing of said plate, a downwardly extending projection formed in the bight portion of said plate spaced inwardly from the wing portions being of a shape to enter the slots formed in the post member and having its lower portion formed with walls at right angles to each other substantially parallel with the walls of the post member such that the outer surfaces of the said projection walls abut the mutually co-extensive inner surfaces of the post member walls in rigid but removable engagement.

7. A locking mechanism as claimed in claim 6 in which the load supporting means comprise an upwardly extending bracket formed outwardly of the plane of the wing of the end plate.

References Cited by the Examiner
UNITED STATES PATENTS

| | | | |
|---|---|---|---|
| 2,076,811 | 4/1937 | Ehlers | 189—36 |
| 2,103,106 | 12/1937 | Yurkovitch | 248—224 |
| 2,959,291 | 11/1960 | Mapson | 211—177 |
| 3,048,245 | 8/1962 | Shewell | 189—36 |
| 3,100,574 | 8/1963 | Buechler | 211—177 |

CLAUDE A. LE ROY, *Primary Examiner.*

FRANK L. ABBOTT, *Examiner.*